Jan. 14, 1969 V. DULGER 3,421,738

INJECTOR

Filed July 3, 1967

Inventor:
Viktor Dulger
by Michael S. Shiker
Attorney

United States Patent Office 3,421,738
Patented Jan. 14, 1969

3,421,738
INJECTOR
Viktor Dulger, Heidelberg-Kirchheim, Germany, assignor to Chemie- und Filter G.m.b.H., Heidelberg-Kirchheim, Germany
Filed July 3, 1967, Ser. No. 651,053
U.S. Cl. 259—4          15 Claims
Int. Cl. B01f 1/00; B01f 3/08; B05b 7/32

ABSTRACT OF THE DISCLOSURE

A mixing arrangement comprises a receptacle having an upper open end and a cover for closing this open end. The cover is formed with a main conduit through which a stream of a liquid phase can pass. The cover further carries a bypass conduit including a first portion which connects the main conduit with a chamber defined by a wall which consists at least in part of open-pore material and which is suspended from the free end of the first portion of the bypass conduit. The receptacle is adapted to contain another liquid phase to a predetermined level and, when the cover is connected to the receptacle, the chamber is suspended within the additional liquid phase below this predetermined level. A second portion of the bypass conduit communicates with the receptacle outside of the chamber and with the main conduit downstream of the point at which the first portion communicates with the main conduit. Diverting means is provided for continuously diverting a quantity of the phase passing through the main conduit into the first portion of the by-pass conduit. The diverted quantity is thus compelled to pass through the pores of the wall defining the chamber and thereupon through the other phase contained in the receptacle before it reenters the main conduit through the second portion of the by-pass conduit.

*Background of the invention*

The present invention generally relates to a mixing arrangement and in particular to an arrangement for mixing two liquid phases. Still more particularly the present invention relates to a mixing arrangement for admixing a first liquid phase, obtained by dissolving a soluble particulate material, with another liquid phase.

There are many applications where it is necessary to dissolve a solid or particulate material whereby a solution is obtained, and to thereupon admix this solution, which constitutes a first liquid phase, with a second liquid phase. In such applications it is usually of particular importance that the first liquid phase, that is the solution of the soluble material, be admixed with the second liquid phase at a precisely determined ratio. In addition to this it is essential that intimate admixture of the two phases take place.

Attempts have been made in the prior art to obtain these desired characteristics by providing a mixing arrangement which comprises a receptacle subdivided into two compartments by a suitable screen. One of the compartments contains the material to be dissolved and the receptacle is filled with a fluid in which the dissolution of this material is to take place. A main conduit carries the liquid phase with which the solution is to be admixed, first auxiliary conduit and a suitable baffle serve to divert a quantity of this phase into the interior of the receptacle, more particularly to that section which contains only the solution but not the material to be dissolved itself. A second auxiliary conduit connects this same section of the receptacle with the main conduit downstream of the point where the first auxiliary conduit branches off. Thus, the inflowing liquid phase displaces a proportionate quantity of the contents of the receptacle, which quantity then flows via the second auxiliary conduit into the main conduit. Nozzles or similar expedients are provided for regulating the flow of phase into the receptacle.

While this prior-art construction is by no means inoperative it does suffer from certain disadvantages. Specifically, it has been found that the nozzles in the first auxiliary conduit become very easily clogged whenever even small quantities of solid contaminants are present in the incoming phase, a condition which very often cannot be avoided and which necessitates frequent shut-down of the mixing arrangement. Moreover, the stream of phase entering the receptacle through the first auxiliary conduit sets up a well-defined flow from this first auxiliary conduit through the receptacle and to the inlet of the second auxiliary conduit. As a result of this, a differential in the concentration of the solution is quickly established between those regions of the solution through which this flow of phase passes and those regions which are spaced from the flow. This differential is influenced by the flow speed of the liquid phase in the main conduit and becomes more pronounced as this speed is increased. As a result the metering effect obtained with this prior-art construction is only approximate and truly proportional admixing of the solution with the liquid phase is not possible.

The above-described mixing arrangement is of course not the only one known from the prior art. However, other such prior-art constructions known to me suffer from the same disadvantages as the arrangement described namely the frequent clogging of nozzles which are necessary for proper operation of the devices, and the impossibility of obtaining a truly proportional admixing of the solution with the liquid phase.

*Summary of the invention*

The present invention overcomes the disadvantages outlined above.

More particularly, the present invention provides a mixing arrangement which affords true proportionality of admixture of one liquid phase to another.

The mixing arrangement according to the present invention is not subject to clogging by solids contained in either of the phases to be admixed. In fact, the mixing arrangement according to the present invention does not utilize any type of nozzle whatsoever and thus is not only free from clogging, but is also simpler and more economical in its construction than would otherwise be possible.

The novel mixing arrangement according to my invention is so simple and reliable that neither its operation nor its maintenance requires any particular skill on the part of the operator.

In accordance with one feature of my invention my novel mixing arrangement which is particularly suitable for admixing two liquid phases includes first wall means which defines an outer chamber adapted to contain a first one of the liquid phases. This first liquid phase fills the outer chamber to a predetermined level. Second wall means, which consist at least in part of open-pore material, defines an inner chamber which is located within the outer chamber downwardly of the predetermined level to which the later is filled with the first liquid phase. Main conduit means is arranged so that a stream of a second liquid phase passes therethrough. Bypass-conduit means is provided and includes a first portion which connects the main conduit means with the inner chamber, and a second portion which communicates with the outer chamber outside of the inner chamber. The second portion communicates with the main conduit means downstream of the first portion. Finally I provide diverting means which is operative for continuously diverting a quantity of the second phase into the first portion of the bypass conduit means whereby this thus idverted quantity is compelled to pass through the pores of the second wall means and thereupon through the first liquid phase before it can enter into the second portion of the bypass conduit means which then conveys it back to the main conduit means.

On passing through the pores of the porous member the diverted quantity of liquid is of course resolved into a great number of thin jets and the total surface area of these jets which is available for contact with the solution contained in the outer chamber is very much greater than the surface area which would be available by passing the diverted liquid through the solution in a single stream. The fluid in each of these jets arises upwardly through the solution contained in the outer chamber towards the inlet of the second bypass-conduit portion and the result is a very intimate admixture with the solution and a very precise proportionality of admixture. Inasmuch as the porous material provides for the passage of diverted liquid a flow resistance dependent upon the quantity of liquid passing through, it also acts as a substitute for the nozzles which, as outlined earlier, are necessary in the prior art constructions. Contrary to the problems encountered in these prior art constructions where the nozzles frequently become clogged by impurities, this danger does not exist with the present invention because the porous material has of course a much greater cross-section than the nozzle openings while being of the same efficiency as these nozzles. I have found it to be particularly advantageous to construct the porous member of a sintered material having a pore width ranging between 1 and 1,000 microns. This is of course by way of example only and is not to be considered limiting. However, with the use of such sintered material the flow resistance $k$ is determined according to the formula:

$$k = Q/\sqrt{\Delta p} \text{ (msec.}^{-1} \text{ mm. WS}^{-1/2}\text{)}$$

with $Q$ being the diverted liquid and $\Delta p$=the pressure decrease at the baffle of the main conduit. The flow resistance is approximately quadratic and the admixture which takes place in the outer chamber is very even, and this results in an exceedingly good proportionality in the metering. As mentioned earlier, the surface area of the porous member which is available for passage therethrough of the diverted liquid is considerably larger than the opening of conventionally used nozzles, and is, in fact, almost 100 times greater than the opening of a nozzle having a comparable effect. It will be understood that this eliminates the danger of clogging for all practical purposes.

According to a further feature of my invention the porous member, or the member containing a porous wall portion can be constructed as a hollow cylinder which is arranged vertically within the outer chamber and can, together with additional wall portions define the inner chamber which at its bottom end may contain a sedimentation zone, so that if impurities of a solid nature are contained in the diverted liquid, they will slide downwardly along the vertical inner wall surfaces and will collect in the sedimentation zone.

Another advantageous feature in accordance with the invention is the addition of an auxiliary conduit which communicates with the inner chamber on the one hand and with the main conduit on the other hand. Communication with the main conduit can be either directly downstream of the point at which the first portion of the bypass conduit communicates with the main conduit or, and I prefer this, communication can be with the second or return-flow portion of the bypass conduit upstream of the point at which the second portion communicates with the main conduit that is before the second portion communicates with the main conduit. In providing such an auxiliary conduit I additionally provide a throttling means and thus make it possible to have an adjustable portion of the diverted quantity of liquid pass from the inner chamber directly back to the main conduit without having come into contact with the solution in the outer chamber. This makes it possible to admix exceedingly small quantities of the solution in the outer chamber with the main phase while yet maintaining the desired proportionality. Furthermore, by diverting relatively large quantities of the main phase even if only a small portion of such diverted quantity is to pass through the solution in the outer chamber and by shunting the remainder of the diverted quantity back into the main conduit, I assure that any solid impurities contained in the diverted liquid are returned back to the main conduit through the auxiliary or shunt conduit if they are not already trapped in the sedimentation zone of the inner chamber. Moreover, in a construction where the auxiliary or shunt conduit communicates with the second portion of the bypass conduit upstream of the point at which the second portion communicates with the main conduit I obtain an additional admixture and equalization of the main-phase liquid with the solution.

I have also found it to be highly advantageous if the conduits connecting the main conduit with the inner chamber are constructed as flexible hoses and if the weight of the inner chamber is so selected that it corresponds substantially to the specific gravity of the solution in the outer chamber. With the construction of this nature the chamber will automatically float to that level of the solution contained in the outer chamber at which a certain concentration of the solution exists and this, it will be understood means that the liquid issuing from the pores of the porous material will enter into a zone of the solution in the outer chamber whose degree of concentration of the solution will always be substantially identical.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Description of the preferred embodiments*

Figure 1:
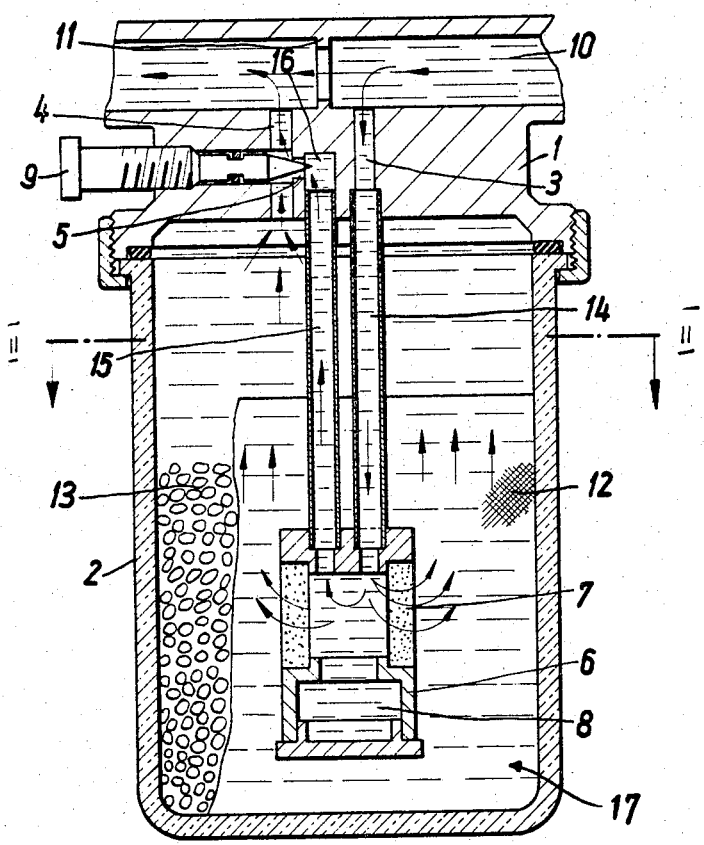
FIG. 1 is a vertical section through a device according to the present invention.
Figure 2:
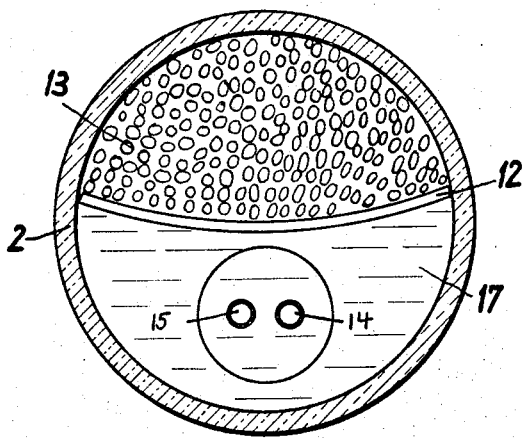
FIG. 2 is a transverse section taken on the line II–II of FIG. 1.

Discussing now the drawing in detail it will be seen that my novel device comprises in the embodiment illustrated, an upper portion 1 and a lower portion 2 which constitutes a container and will be so characterized hereafter. The portions 1 and 2 are releasably connected to one another by cooperating screw threads utilizing an O-ring of elastomeric material as a seal. Neither the screw threads nor the O-ring are identified with reference numerals because they do not constitute part of the invention and could be readily replaced by other expedients.

The upper portion 1 is provided with a main conduit 10 wherein there is arranged a baffle 11. Upstream of the baffle 11 that is upstream of the direction of flow indicated by the arrows in the main conduit 10, a first portion 3 of a bypass conduit communicates with the main conduit 10 and a second portion 4 of this same bypass conduit communicates downstream of the baffle 11. A sieve-like divider 12 separates the interior of the container 2 into two chambers, namely a first chamber 13 which contains the material to be dissolved which material may be granular, in chunks, or generally particulate, and a second chamber 17 which will contain the solution obtained by dissolving the material in chamber 13 in a suitable liquid. As a result of the sieve-like character of the divider 12 none of the solid material can pass from chamber 13 into chamber 17.

The inner chamber mentioned before is located within the solution-containing chamber 17 and is identified with reference numeral 6. It is constituted at least in part of a wall 7 of porous material, preferably sintered material as mentioned before and in the illustrated embodiment this wall 7 defines the configuration of a hollow cylinder. A non-porous wall portion of the chamber 6 which, as evident from the drawing, is arranged vertically in the solution-containing chamber 17 defines in the bottom region of the chamber 6 a sedimentation zone 8. A tube 14, which preferably is flexible as mentioned earlier, constitutes a part of the first portion of the bypass conduit 3 and connects this first portion with the interior of the chamber 6. The second or return flow portion of the bypass conduit comprises the interior of the container 2 and the portion or bore 4 in the upper portion or cover 1, with the liquid flowing in the direction of the arrows upwardly into this portion 4.

In the illustrated embodiment I provide a second tube 15 which also communicates with the interior of the chamber 6 and which, at its upper end, within the cover 1 communicates with a bore 16 which, in turn is connected with the bore 4 via a channel 5 into which there projects the tip of a throttling screw 9 which can be advanced deeper into and retracted from the channel 5 because of its external screw threads which mate with internal screw threads in the cover 1.

In operation of my novel device the cover 1 is separated from the container 2, the solid material to be dissolved is introduced into the chamber 13 and the remainder of the container 2 is filled with a suitable liquid for dissolving the material in chamber 13 for instance with water. Thereupon, cover 1 is connected to the container 2 and a solution of the solid material in the water now forms in the chamber 17. It is this solution which is to be introduced into the liquid flowing in the main conduit 10. The flow of such liquid in the main conduit 10 in the direction of the arrows indicated therein produces a pressure differential at a baffle 11 with the result that a quantity of the liquid is diverted from the main conduit 10 into the first portion 3, 14 of the bypass conduit and from there into the interior of the chamber 6. From the interior of the chamber 6 this thus-diverted liquid passes through the porous wall 7 and issues from the exterior thereof into the solution contained in the chamber 17 in a multitude of thin jets which then rise in the concentrated solution in the direction of the arrows and pass into the second portion 4, that is the return flow portion of the bypass conduit.

By withdrawing the throttling screw 9 to a greater or lesser degree from the channel 5 I make it possible to shunt a portion of the diverted liquid through the shunt conduit 15, 16. In other words, the shunted portion of the liquid will not pass through the porous wall 17 but will rather rise directly from the interior of the chamber 6 through the tube 15 and the bore 16 and will enter into the second portion 4 of the bypass conduit where it becomes thoroughly admixed with the mixture of liquid and solution entering the portion 4 from the interior of the container 2.

The admixture of the liquid passing through the pores of the porous wall 7 and subsequently through the solution in chamber 17, with this solution is subject to very little fluctuation, particularly in view of the fact that the flow resistance of the porous material is dependent upon the flow quantity, and the result is that despite fluctuations of the liquid in the main conduit 10, which may reach proportions as high as 1:25, deviation from an exactly proportional admixture is encountered only to the extent of a few percentage points.

Of course, variations of the illustrated embodiment and other embodiments are entirely possible and will readily offer themselves to those skilled in the art. All of this is intended to be encompassed by the appended claims. Thus, I have found it advantageous if the cover 1, the main conduit 10, the tubes 14 and 15 and the chamber 6 together form a unit so that they can be secured to and removed from the container 2 as a unit. However, it will be readily evident that this construction is by no means limiting and that other constructions are quite conceivable. Also, of course, it is not necessary to use a sintered material for the wall 7 although I prefer the utilization of such a material. Nor is it necessary that the wall 7 define a vertically positioned hollow cylinder, because, evidently, a different configuration and/or a different positioning of this wall is equally well possible.

It will be understood that each of the elements described above, or two or more together, may also find a useful application in other types of arrangements differing from the types described above.

While the invention has been illustrated and described as embodied in a mixing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A mixing arrangement, particularly for admixing two liquid phases, comprising, in combination, first wall means defining an outer chamber adapted to contain a first liquid phase; second wall means consisting at least in part of a material permeable to liquid and defining within said outer chamber an inner chamber; main conduit means arranged for passage of a stream of a second liquid phase therethrough; bypass conduit means including a first portion connecting said main conduit means with said inner chamber, and a second portion communicating with said outer chamber outside of said inner chamber and with said main conduit means downstream of said first portion; and diverting means operative for continuously diverting a quantity of said second phase into said first portion of said bypass conduit means so that such quantity is compelled to pass through the liquid-permeable material of said second wall means and thereupon through said first liquid phase prior to entry into said second portion.

2. An arrangement as defined in claim 1; and further comprising means subdividing said outer chamber into a first section containing said inner chamber, and a second section communicating with said first section and adapted to contain soluble particulate material.

3. An arrangement as defined in claim 1, wherein said second wall means is of annular cross-sectional outline.

4. An arrangement as defined in claim 1, wherein said second wall means defines a hollow cylinder.

5. An arrangement as defined in claim 4, wherein said hollow cylinder has a closed axial end.

6. An arrangement as defined in claim 4, said hollow cylinder having a closed axial end, and a longitudinal vertical axis.

7. An arrangement as defined in claim 4, said hollow cylinder having a closed lower axial end and a partition subdividing said inner chamber into an upper zone and a communicating lower sedimentation zone, said first portion of said bypass conduit means communicating with said upper zone.

8. An arrangement as defined in claim 1, wherein said liquid-permeable material is an open-pore sintered material.

9. An arrangement as defined in claim 1, wherein said liquid-permeable material is an open-pore sintered material having a pore size of between 1 and 1,000 microns.

10. An arrangement as defined in claim 1; and further comprising adjusting means operatively associated with said conduit means for controlling the flow of the diverted quantity of second phase.

11. An arrangement as defined in claim 10 wherein said adjusting means comprises shunt-conduit means operatively associated with said main conduit means and communicating with said inner chamber for shunting some of the diverted second phase from said inner chamber into said main conduit means.

12. An arrangement as claimed in claim 11, said adjusting means further comprising adjustable throttling means for throttling the flow of shunted second phase from said inner chamber into said main conduit means.

13. An arrangement as claimed in claim 11, said shunt-conduit means communicating with said second portion of said bypass-conduit means at a point between the points of communication of said second portion with the outer chamber and main conduit means.

14. An arrangement as defined in claim 1, wherein said outer chamber means is adapted to contain a first liquid phase having a predetermined specific gravity; part of said bypass conduit means being flexible and said second wall means having a specific gravity substantially corresponding to said predetermined specific gravity.

15. An arrangement as defined in claim 1, wherein said outer chamber has an upper open end; and further comprising cover means connectable to said first wall means overlying said open end and supporting all said other means whereby such other means are connectable and disconnectable from said first wall means as a unit.

References Cited

UNITED STATES PATENTS

| | | | |
|---|---|---|---|
| 1,458,975 | 6/1923 | Clauson | 239—317 |
| 1,971,852 | 8/1934 | Goebels | 259—4 |
| 2,842,465 | 7/1958 | Harrison. | |
| 3,165,114 | 1/1965 | Garrett | 239—317 XR |
| 3,194,444 | 7/1965 | Hubert | 239—317 XR |

WALTER A. SCHEEL, *Primary Examiner.*

JOHN M. BELL, *Assistant Examiner.*

U.S. Cl. X.R.

239—317